United States Patent
Wang et al.

(10) Patent No.: US 10,711,194 B2
(45) Date of Patent: Jul. 14, 2020

(54) LIQUID CRYSTAL COMPOSITION AND LIQUID CRYSTAL DISPLAY ELEMENT OR LIQUID CRYSTAL DISPLAY COMPRISING SAME

(71) Applicant: SHIJIAZHUANG CHENGZHI YONGHUA DISPLAY MATERIAL CO., LTD, Shijiazhuang, Hebei Prov. (CN)

(72) Inventors: Mingxia Wang, Shijiazhuang (CN); Sumin Kang, Shijiazhuang (CN); Guoliang Yun, Shijiazhuang (CN)

(73) Assignee: SHIJIAZHUANG CHENGZHI YONGHUA DISPLAY MATERIAL CO., LTD., Shijiazhuang, Hebei Prov. (CN)

( * ) Notice: Subject to any disclaimer, the term of this patent is extended or adjusted under 35 U.S.C. 154(b) by 96 days.

(21) Appl. No.: 15/876,750

(22) Filed: Jan. 22, 2018

(65) Prior Publication Data
US 2018/0208845 A1    Jul. 26, 2018

(30) Foreign Application Priority Data
Jan. 22, 2017  (CN) .......................... 2017 1 0053538

(51) Int. Cl.
| | | |
|---|---|---|
| *C09K 19/42* | (2006.01) | |
| *C09K 19/06* | (2006.01) | |
| *C09K 19/30* | (2006.01) | |
| *C09K 19/04* | (2006.01) | |
| *C09K 19/12* | (2006.01) | |
| *C09K 19/34* | (2006.01) | |

(52) U.S. Cl.
CPC ........ *C09K 19/068* (2013.01); *C09K 19/0403* (2013.01); *C09K 19/12* (2013.01); *C09K 19/3003* (2013.01); *C09K 19/3491* (2013.01); *C09K 2019/0407* (2013.01); *C09K 2019/0448* (2013.01); *C09K 2019/122* (2013.01); *C09K 2019/123* (2013.01); *C09K 2019/301* (2013.01); *C09K 2019/3009* (2013.01); *C09K 2019/3013* (2013.01); *C09K 2019/3016* (2013.01); *C09K 2019/3027* (2013.01)

(58) Field of Classification Search
CPC ..................................................... C09K 19/42
See application file for complete search history.

(56) References Cited

U.S. PATENT DOCUMENTS

| | | | | |
|---|---|---|---|---|
| 2015/0299574 A1* | 10/2015 | Hirschmann | ...... | C09K 19/3098 252/299.61 |
| 2016/0298034 A1* | 10/2016 | Lietzau | .............. | C09K 19/3491 |
| 2017/0362506 A1* | 12/2017 | Hirschmann | ...... | C09K 19/3491 |

\* cited by examiner

*Primary Examiner* — Chanceity N Robinson
(74) *Attorney, Agent, or Firm* — Muncy, Geissler, Olds & Lowe, PC

(57) ABSTRACT

The present invention provides a liquid crystal composition comprising one or more compounds of general formula I and one or more compounds of general formula II; the liquid crystal composition of the present invention can work at very high and very low temperatures, has a very short response time and a better reliability to light and heat, and particularly exhibits no image retention or a significantly reduced image retention after a long time operation.

11 Claims, No Drawings

LIQUID CRYSTAL COMPOSITION AND LIQUID CRYSTAL DISPLAY ELEMENT OR LIQUID CRYSTAL DISPLAY COMPRISING SAME

TECHNICAL FIELD

The present invention belongs to the liquid crystal display field, and particularly relates to a liquid crystal composition and a liquid crystal display element or liquid crystal display comprising same.

BACKGROUND ART

Display is the process of converting an electrical signal (data information) into visible light (visual information), and devices implementing display, i.e., Man-Machine Interface (MMI) and Flat Panel Display (FPD), are currently the most popular type of display devices. Liquid crystal display (LCD) is the first developed and commercialized product among FPDs. At present, Thin Film Transistor Liquid Crystal (TFT-LCD) has become the mainstream product in LCD applications.

The development of TFT-LCD has gone through a long period of basic research, and after realizing large-scale production and commercialization, the TFT-LCD products are getting larger and larger in size and more and more widely used due to the advantages of lightness, being environmentally friendly, high performance, etc. thereof. TFT-LCD applications can be found everywhere, from small-sized mobile screens to large-sized notebook PCs or monitors and large-format liquid crystal display televisions (LCDTV). The TFT-LCDs can be divided into three categories, namely, Twisted Nematic/Super Twisted Nematic (TN/STN) type, In-Plane Switching (IPS) type and Vertical Alignment (VA) type, respectively. The early commercial TFT-LCD products are mainly in a Twisted Nematic (TN) type display mode, and the largest problem thereof is that the viewing angle is not wide enough. With the increase of the size of TFT-LCD products, especially the application of TFT-LCD in the field of TVs, an In-Plane Switching (IPS) display mode with a wide viewing angle has been developed and applied. The IPS display mode was first published in a paper by an American, R. Soref, in 1974, and a German, G Baur, proposed to apply IPS as a wide viewing angle technique to TFT-LCD. In 1995, Hitachi Ltd., Japan, developed the first 13.3-inch IPS mode wide viewing angle TFT-LCD product in the world.

Compared with other types of liquid crystal displays, a liquid crystal display of a VA type has a very high contrast because in an un-energized dark state, liquid crystal molecules are arranged perpendicular to the surface of a substrate without producing any phase difference and with a very low light leakage and a very low dark state brightness, and the lower the dark state brightness, the higher the contrast; so liquid crystal displays of a VA type have a very wide range of applications in large-size displays, such as televisions. However, in pursuit of higher performance specifications, increasing the response speed, lowering the threshold voltage, increasing the voltage holding ratio, decreasing the ion density and improving the display yield have become the goals pursued by various device manufacturers.

SUMMARY OF THE INVENTION

The technical problem to be solved by the present invention is to provide a negative dielectric anisotropic liquid crystal composition, which particular liquid crystal composition does not have the above-mentioned defects. In particular, it can work at very high and very low temperatures, has a very short response time and a better reliability to light and heat, and particularly exhibits no image retention or a significantly reduced image retention after a long time operation.

Surprisingly, the use of one or more liquid crystal compounds represented by formula I and one or more liquid crystal compounds represented by formula II in a liquid crystal mixture, particularly in a mixture having a negative dielectric anisotropy, preferably in an LC mixture for VA, IPS and FFS displays, can improve rotational viscosity value and the corresponding response time.

In order to achieve the above-mentioned technical effects, the present invention provides a liquid crystal composition comprising one or more compounds represented by formula I and one or more compounds represented by formula II

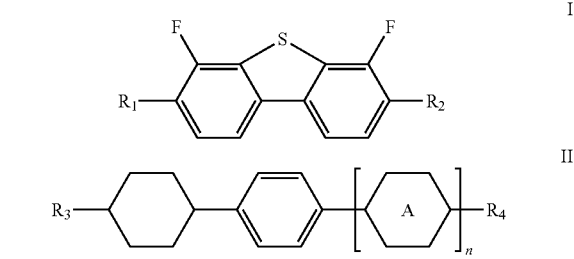

wherein $R_1$, $R_2$, $R_3$ and $R_4$ each independently represent a linear alkyl having a carbon atom number of 1-5, a linear alkoxy having a carbon atom number of 1-5, an alkenyl having a carbon atom number of 2-5, F, Cl, $CF_3$, $OCF_3$, or any methylene that may be replaced with

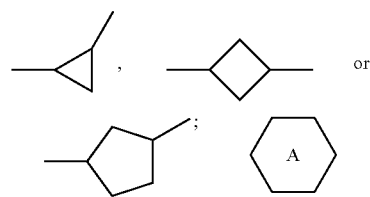

represents

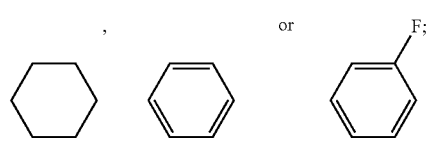

and
n represents 0 or 1.

A further improvement of the technical solution of the present invention lies in: the total content by mass of said one or more compounds of formula I is 1-20%, and the total content by mass of said one or more compounds of formula II is 1-25%.

Said one or more compounds represented by formula I are preferably one or more of compounds represented by formulas I1-I27,

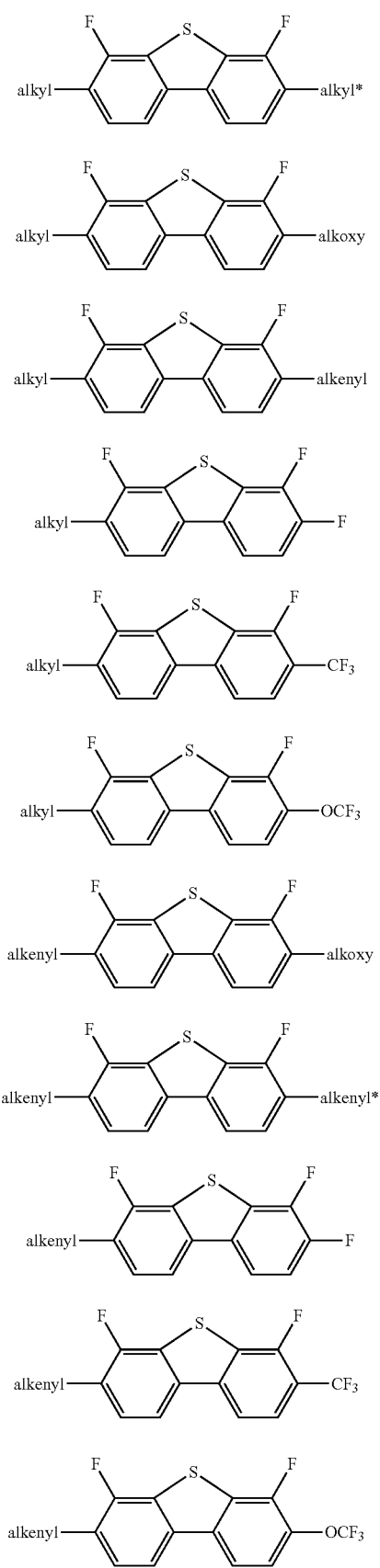
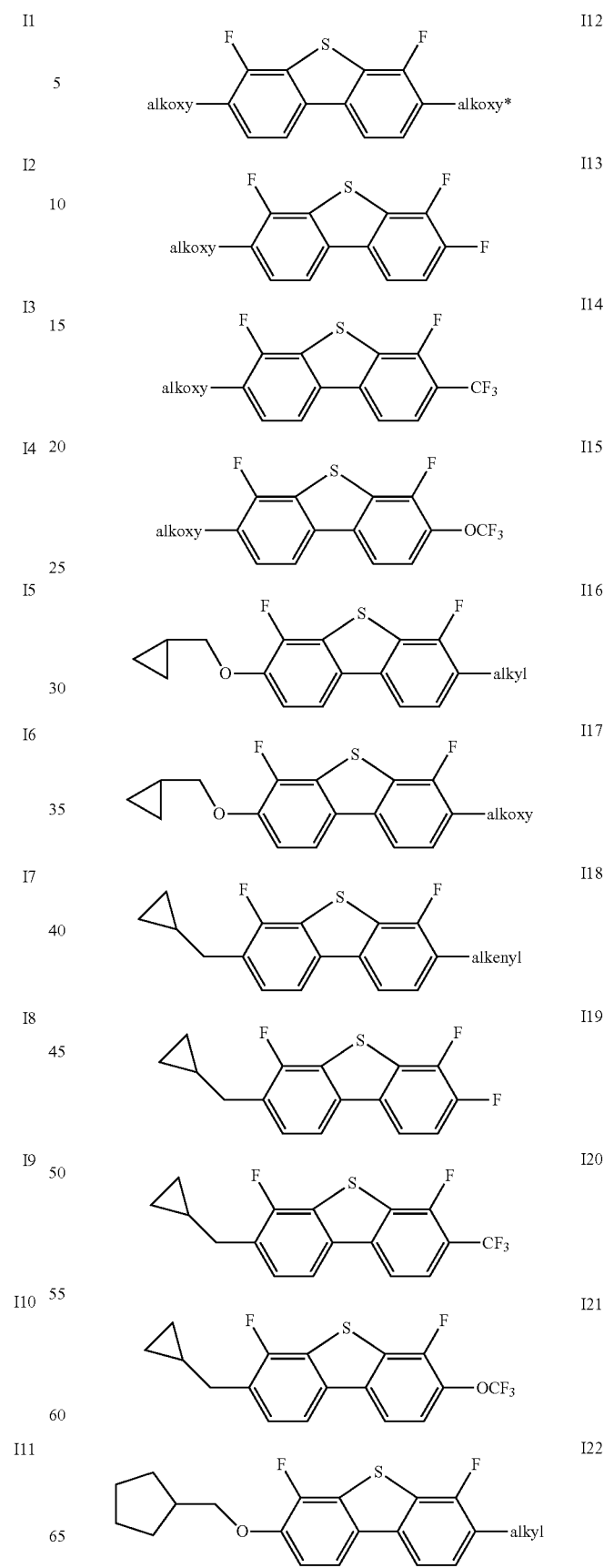

-continued

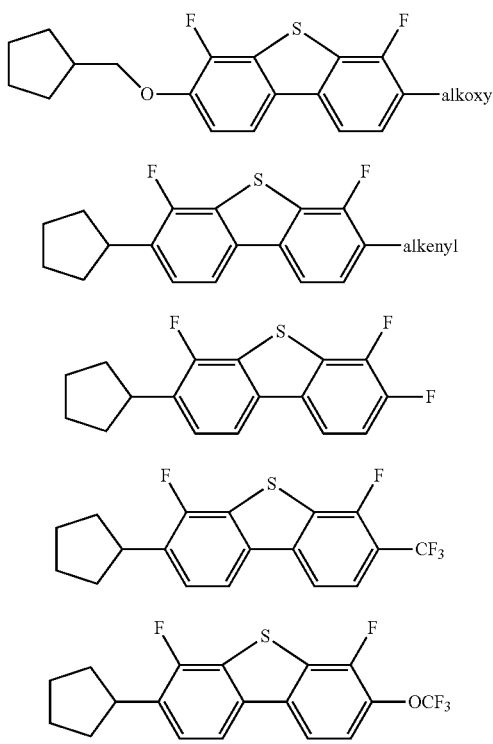

wherein alkyl and alkyl* each independently represent a linear alkyl having a carbon atom number of 1-5;

alkoxy and alkoxy* each independently represent a linear alkoxy having a carbon atom number of 1-5; and alkenyl and alkenyl* each independently represent an alkenyl having a carbon atom number of 2-5;

said one or more compounds represented by formula II are preferably one or more of compounds represented by formulas II1-II4,

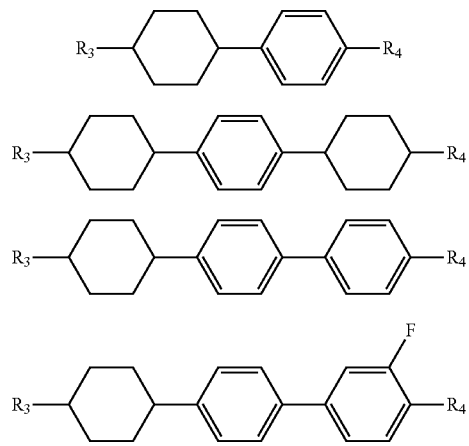

wherein $R_3$ and $R_4$ each independently represent a linear alkyl having a carbon atom number of 1-5, a linear alkoxy having a carbon atom number of 1-5 or an alkenyl having a carbon atom number of 2-5, or F, Cl, $CF_3$, $OCF_3$,

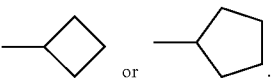

Said liquid crystal composition may further comprise one or more compounds represented by general formula III,

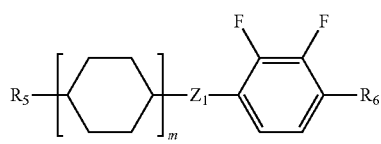

wherein $R_5$ and $R_6$ each independently represent a linear alkyl having a carbon atom number of 1-5 or a linear alkoxy having a carbon atom number of 1-5;

$Z_1$ represents a single bond, —$CH_2O$— or —$OCH_2$—; and m represents 1 or 2.

Said liquid crystal composition may further comprise one or more compounds represented by general formula IV,

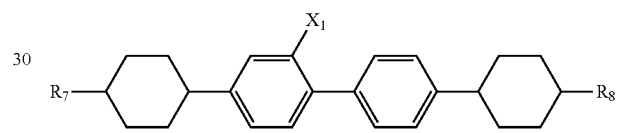

wherein $R_7$ and $R_8$ each independently represent a linear alkyl having a carbon atom number of 1-5 or a linear alkoxy having a carbon atom number of 1-5;

and $X_1$ represents H or F.

Said liquid crystal composition may further comprise one or more compounds represented by general formula V,

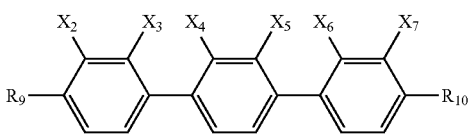

wherein $R_9$ and $R_{10}$ each independently represent a linear alkyl having a carbon atom number of 1-5 or a linear alkoxy having a carbon atom number of 1-5;

and $X_2$, $X_3$, $X_4$, $X_5$, $X_6$ and $X_7$ each independently represent H or F, with at least two representing F atom.

In said liquid crystal composition, the total content in percentage by mass of said one or more compounds represented by formula I is preferably 1-10%, the total content in percentage by mass of said one or more compounds represented by formula III is preferably 1-50%, the total content in percentage by mass of said one or more compounds represented by formula IV is preferably 1-15%, and the total content in percentage by mass of said one or more compounds represented by formula V is preferably 1-20%.

Said liquid crystal composition may further comprise one or more polymerizable compounds.

The polymerizable compound is preferably a compound represented by general formula RM-1

RM-1

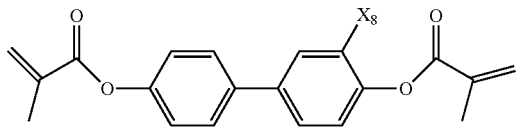

wherein $X_8$ represents H or F.

The present application further claims a liquid crystal display element or liquid crystal display comprising any one of the above-described liquid crystal compositions, said liquid crystal display element or liquid crystal display being an active matrix display element or display, or a passive matrix display element.

A further improvement of the technical solution of the present invention lies in: adding a small amount of a polymerizable compound to a liquid crystal medium, and after filling same into a liquid crystal cell, allowing same to generally polymerize or crosslink in situ by UV photopolymerization with or without the application of a voltage between electrodes. This causes liquid crystal molecules to pre-tilt in the cell, and the pre-tilt has a positive effect on the response time. In addition, the material system composed of the liquid crystal composition+the polymerizable compound of general formula RM-1 of the present invention has a low rotational viscosity and better electrical properties, particularly a "voltage holding ratio (VHR or HR)". Since UV exposure is an essential part of the process of manufacturing a display, this point is crucial.

DETAILED DESCRIPTION OF EMBODIMENTS

The present invention is further described in detail in conjunction with particular examples below, but the present invention is not limited to the following examples. Said methods are all conventional methods, unless otherwise specified. Said raw materials are all commercially available, unless otherwise specified. Said percentages are all by mass, unless otherwise specified.

In the following specific examples,

CP represents a clear point, and is measured directly using a WRX-1S microthermal analyzer, with the temperature rise rate being set to 3° C./min.

Δn represents optical anisotropy (589 nm, 20° C.),

Δε represents dielectric anisotropy (25° C., 1 KHz, HP4284A, 5.2 μm TN left-hand rotate cell), γ1 represents a rotational viscosity at 20° C. (MPa·s), VHR (%) represents a charge holding ratio (5 V, 60 Hz, 20° C.), ρ (×1013 Ω·cm) represents an electrical resistivity (20° C.), ID: ion density at 70° C. (pC/cm$^2$)

τ represents a response time: $t_{on}+t_{off}$ $t_{on}$ represents an on-time until reaching 90% of the maximum contrast $t_{off}$ represents an off-time until reaching 10% of the maximum contrast A tester for the voltage holding ratio VHR (%) and a tester for an electrical resistivity ρ (×1013 Ω·cm) are physical property evaluation systems of respectively TOY006254-type and TOY06517-type liquid crystals (a test temperature of 20° C., a time of 16 ms, and a test cell of 7.0 μm).

Image Persistence:

an image persistence evaluation on a liquid crystal display element refers to a 4-level evaluation below on the ghosting level of a specified fixed pattern by visual inspection during uniformly displaying the full image after allowing the fixed pattern to display for 1,000 hours in a display area.

⊚ no ghosting

○ minor ghosting, in a permissible level

Δ ghosting, in an impermissible level x ghosting, in a quite poor level

In addition, in the examples of the present invention application, liquid crystal monomer structures are represented by codes, wherein the code representation of cyclic structures, end groups and linking groups of the liquid crystals are shown in tables (I) and (II) below.

TABLE (I)

Codes corresponding to cyclic structures

| Cyclic structures | Corresponding codes |
| --- | --- |
| cyclohexane | C |
| benzene | B |
| 3-fluorobenzene | B(3F) |
| 3,5-difluorobenzene | B(3F, 5F) |
| difluoro-dibenzothiophene with methyl | Y |
| difluoro-dibenzothiophene | DFDB(S)F |
| cyclopentane | H(5) |
| cyclobutane | H(4) |
| cyclopropane | H(3) |

TABLE (II)

| Codes corresponding to end groups and linking groups | |
|---|---|
| End groups and linking groups | Corresponding codes |
| $C_nH_{2n+1}-$ | n |
| $C_nH_{2n+1}O-$ | nO |
| $-CF_3$ | $CF_3$ |
| $-OCF_3$ | $OCF_3$ |
| $-CF_2O-$ | Q |
| $-F$ | F |
| $-CH_2=CH_2-$ | V |

For example:

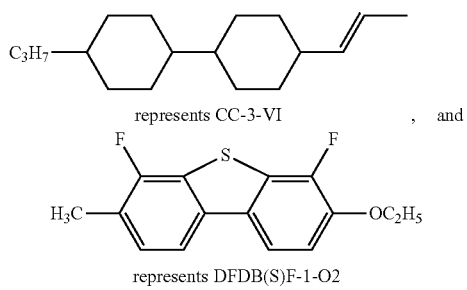

represents CC-3-V1, and represents DFDB(S)F-1-O2

The following tables relate to the formulations and basic optical parameters of a comparative liquid crystal composition and 6 liquid crystal compositions:

Comparative Liquid Crystal Composition:

| Classification | Liquid crystal monomer codes | Content (%) |
|---|---|---|
|  | CCB-3-5 | 10 |
| III | C1OY-3-O2 | 30 |
| III | CY-3-O2 | 20 |
| IV | CGPC-3-3 | 5 |
| V | PYP-2-3 | 10 |
|  | CC-3-V | 15 |
|  | CC-3-2 | 10 |

Δn[589 nm, 20° C.]: 0.1085
Cp[° C.]: 75
Δε[1 KHz, 20° C.]: −3
γ₁[mPa · s, 20° C.]: 105

Liquid Crystal Composition 1

| Classification | Liquid crystal monomer codes | Content (%) |
|---|---|---|
| I | DFDB(S)F-3O-O2 | 0.5 |
| I | DFDB(S)F-2-O5 | 0.5 |
| I | DFDB(S)F-2-V | 0.5 |
| II | CB-3-5 | 2 |
| II | CBB-5-2 | 3 |
| III | C1OY-3-O2 | 20 |
| III | CY-3-O2 | 30 |
| IV | CGPC-3-3 | 5 |
| V | PYP-2-3 | 5 |
|  | CC-3-V | 23.5 |
|  | CC-3-2 | 10 |

Δn[589 nm, 20° C.]: 0.1083
Cp[° C.]: 90
Δε[1 KHz, 20° C.]: −3.5
γ₁[mPa · s, 20° C.]: 60

Liquid Crystal Composition 2

| Classification | Liquid crystal monomer codes | Content (%) |
|---|---|---|
| I | DFDB(S)F-V-V | 1 |
| I | DFDB(S)F-2O-O5 | 2 |
| I | DFDB(S)F-V-F | 2 |
| II | CBB-3-2 | 3 |
| II | CBC-3-O2 | 7 |
| III | CY-3-O2 | 20 |
| III | CCY-3-O2 | 20 |
| IV | CPPC-3-3 | 3 |
| V | PPY-2-3 | 2 |
|  | CC-3-V | 20 |
|  | CC-3-2 | 20 |

Δn[589 nm, 20° C.]: 0.1001
Cp[° C.]: 90.5
Δε[1 KHz, 20° C.]: −3.4
γ₁[mPa · s, 20° C.]: 62

Liquid Crystal Composition 3

| Classification | Liquid crystal monomer codes | Content (%) |
|---|---|---|
| I | DFDB(S)F-2O-F | 5 |
| I | DFDB(S)F-V-CF3 | 2 |
| I | DFDB(S)F-2O-CF3 | 3 |
| II | CBB-3-2 | 7 |
| II | CBC-3-O2 | 8 |
| II | CCY-3-O4 | 15 |
| III | C1OY-2-O5 | 15 |
| IV | CGPC-2-5 | 10 |
| V | PGY-2-3 | 10 |
|  | CC-3-V | 15 |
|  | CC-3-2 | 10 |

Δn[589 nm, 20° C.]: 0.0998
Cp[° C.]: 91
Δε[1 KHz, 20° C.]: −3.8
γ₁[mPa · s, 20° C.]: 69

Liquid Crystal Composition 4

| Classification | Liquid crystal monomer codes | Content (%) |
|---|---|---|
| I | DFDB(S)F-3-F | 5 |
| I | DFDB(S)F-V-OCF3 | 5 |
| I | DFDB(S)F-2O-OCF3 | 5 |
| II | CB-3-O2 | 10 |
| II | CBG-3-O2 | 10 |
| III | CC1OY-3-2 | 13 |
| III | CC1OY-3-O2 | 7 |
| IV | CGPC-2-5 | 15 |
| V | PGY-2-3 | 15 |
|  | CC-3-V | 10 |
|  | CC-3-2 | 5 |

Δn[589 nm, 20° C.]: 0.1083
Cp[° C.]: 96
Δε[1 KHz, 20° C.]: −4.0
γ₁[mPa · s, 20° C.]: 65

Liquid Crystal Composition 5

| Classification | Liquid crystal monomer codes | Content (%) |
|---|---|---|
| I | DFDB(S)F-3-CF3 | 10 |
| I | DFDB(S)F-3-OCF3 | 5 |
| I | DFDB(S)F-V-O2 | 5 |
| II | CB-V-1 | 20 |
| II | CBB-V-2 | 10 |
| III | C1OY-3-O2 | 5 |
| III | CC1OY-4-O3 | 5 |
| IV | CGPC-2-3 | 10 |
| V | PPY-2-3 | 20 |

-continued

| Classification | Liquid crystal monomer codes | Content (%) |
| --- | --- | --- |
| | CC-3-V | 5 |
| | CC-3-2 | 5 |

Δn[589 nm, 20° C.]: 0.1088
Cp[° C.]: 89
Δε[1 KHz, 20° C.]: −4.5
$γ_1$[mPa · s, 20° C.]: 66

Liquid Crystal Composition 6

| Classification | Liquid crystal monomer codes | Content (%) |
| --- | --- | --- |
| I | DFDB(S)F-H(3)1-2 | 1 |
| I | DFDB(S)F-H(3)1-O2 | 1 |
| I | DFDB(S)F-H(3)1-V | 1 |
| II | CBG-3-2 | 5 |
| II | CB-3-F | 5 |
| III | C1OY-3-O2 | 15 |
| III | CY-3-O2 | 20 |
| IV | CGPC-2-3 | 5 |
| V | PPY-2-3 | 10 |
| | CC-3-V | 20 |
| | CC-3-2 | 17 |

Δn[589 nm, 20° C.]: 0.0986
Cp[° C.]: 88
Δε[1 KHz, 20° C.]: −4.6
$γ_1$[mPa · s, 20° C.]: 67

Liquid Crystal Composition 7

| Classification | Liquid crystal monomer codes | Content (%) |
| --- | --- | --- |
| I | DFDB(S)F-H(3)1-F | 4 |
| I | DFDB(S)F-H(3)1-CF3 | 4 |
| I | DFDB(S)F-H(3)1-OCF3 | 4 |
| II | CBC-3-2 | 7 |
| II | CB-3-2 | 8 |
| III | C1OY-3-O2 | 15 |
| III | CC1OY-3-O2 | 15 |
| IV | CGPC-2-3 | 8 |
| V | PGY-2-3 | 7 |
| | CC-3-V | 10 |
| | CC-3-2 | 18 |

Δn[589 nm, 20° C.]: 0.0979
Cp[° C.]: 90
Δε[1 KHz, 20° C.]: −4.8
$γ_1$[mPa · s, 20° C.]: 67

Liquid Crystal Composition 8

| Classification | Liquid crystal monomer codes | Content (%) |
| --- | --- | --- |
| I | DFDB(S)F-H(5)1-2 | 6 |
| I | DFDB(S)F-H(5)1-O2 | 6 |
| I | DFDB(S)F-H(5)1-V | 6 |
| II | CBB-3-2 | 5 |
| II | CB-3-O2 | 5 |
| III | C1OY-3-O2 | 25 |
| III | CC1OY-3-O2 | 25 |
| IV | CGPC-2-3 | 2 |
| V | PGY-2-3 | 5 |
| | CC-3-V | 7 |
| | CC-3-2 | 8 |

Δn[589 nm, 20° C.]: 0.1030
Cp[° C.]: 91
Δε[1 KHz, 20° C.]: −4.8
$γ_1$[mPa · s, 20° C.]: 68

Liquid Crystal Composition 9

| Classification | Liquid crystal monomer codes | Content (%) |
| --- | --- | --- |
| I | DFDB(S)F-H(5)1-F | 5 |
| I | DFDB(S)F-H(5)1-CF3 | 2 |
| I | DFDB(S)F-H(5)1-OCF3 | 3 |
| II | CBB-3-2 | 7 |
| II | CBB-5-2 | 8 |
| III | C1OY-5-O2 | 15 |
| III | CC1OY-3-O2 | 15 |
| IV | CGPC-2-3 | 10 |
| V | PGY-2-3 | 5 |
| | CC-3-V | 15 |
| | CC-3-2 | 15 |

Δn[589 nm, 20° C.]: 0.1008
Cp[° C.]: 91
Δε[1 KHz, 20° C.]: −3.2
$γ_1$[mPa · s, 20° C.]: 70

Liquid Crystal Composition 10

| Classification | Liquid crystal monomer codes | Content (%) |
| --- | --- | --- |
| I | DFDB(S)F-H(5)1O-O2 | 5 |
| I | DFDB(S)F-H(3)1O-O4 | 4 |
| I | DFDB(S)F-2O-O3 | 3 |
| I | DFDB(S)F-3O-O2 | 3 |
| I | DFDB(S)F-3O-O4 | 5 |
| II | CBB-3-2 | 7 |
| II | CBB-5-2 | 8 |
| II | CB-3-O2 | 20 |
| II | CB-V-O2 | 15 |
| II | CBB-V-2 | 15 |
| II | CBB-4-2 | 15 |

Δn[589 nm, 20° C.]: 0.112
Cp[° C.]: 90
Δε[1 KHz, 20° C.]: −3.2
$γ_1$[mPa · s, 20° C.]: 180

Horizontally aligned alignment films are formed on the respective opposite sides of a colour filter glass substrate and an array substrate, followed by a weak friction treatment, to manufacture an IPS (In-Plane Switching) unit, and the comparative liquid crystal composition and liquid crystal compositions 1-9 as shown below are sandwiched between the two substrates, characterized in that the liquid crystal molecules between the two substrates are in a horizontal switch molecular arrangement; and the VHRs, IDs and response times of the resulting liquid crystal display elements are measured. Moreover, an image persistence evaluation is carried out on the resulting liquid crystal display elements.

The following table relates to the performance evaluation measurement data of an IPS liquid crystal display and 10 liquid crystals:

|  | Comparative Example | Example 1 | Example 2 | Example 3 | Example 4 |
|---|---|---|---|---|---|
| Liquid crystal composition | Comparative liquid crystal composition | Liquid crystal composition 1 | Liquid crystal composition 2 | Liquid crystal composition 3 | Liquid crystal composition 4 |
| VHR | 99.0 | 99.3 | 99.5 | 99.6 | 99.3 |
| ID | 77 | 51 | 25 | 36 | 42 |
| τ (ms) | 70 | 35 | 38 | 40 | 37 |
| Image persistence | Δ | ⊚ | ⊚ | ⊚ | ⊚ |

|  | Example 5 | Example 6 | Example 7 | Example 8 | Example 9 | Example 10 |
|---|---|---|---|---|---|---|
| Liquid crystal composition | Liquid crystal composition 5 | Liquid crystal composition 6 | Liquid crystal composition 7 | Liquid crystal composition 8 | Liquid crystal composition 9 | Liquid crystal composition 10 |
| VHR | 99.3 | 99.5 | 99.6 | 99.3 | 99.7 | 99.8 |
| ID | 51 | 25 | 36 | 42 | 40 | 39 |
| τ (ms) | 35 | 38 | 40 | 37 | 41 | 70 |
| Image persistence | ⊚ | ⊚ | ⊚ | ⊚ | ⊚ | ⊚ |

In addition, specific regions of the inner surfaces of a colour filter glass substrate and an array substrate are coated with a vertical alignment agent or a kind of material as an auxiliary alignment agent is added to a crystal to manufacture a VA (Vertical Alignment) unit, and liquid crystal molecules in the comparative liquid crystal composition and liquid crystal compositions 1-9 are vertically aligned on the surfaces of the substrates of the liquid crystal display device; and the VHRs, IDs and response times of the resulting liquid crystal display elements are measured. Moreover, an image persistence evaluation is carried out on the resulting liquid crystal display elements.

The following table relates to the performance evaluation measurement data of a VA liquid crystal display and 10 liquid crystals:

As can be seen obviously from the test results above, the negative dielectric anisotropic liquid crystal compositions disclosed in the present invention have a lower rotational viscosity value, and the IPS (In-Plane Switching) displays and VA (Vertical Alignment) displays manufactured using the negative dielectric anisotropic liquid crystal compositions disclosed in the present invention have a higher VHR, better reliability, a shorter ID and a shorter T, are more excellent in performance in the image persistence evaluation, and particularly have no image retention after a long time operation, as compared with the comparative example.

The invention claimed is:

1. A liquid crystal composition, comprising one or more compounds represented by formulas I16-I27 and one or more compounds represented by formula II

|  | Comparative Example | Example 1 | Example 2 | Example 3 | Example 4 |
|---|---|---|---|---|---|
| Liquid crystal composition | Comparative liquid crystal composition | Liquid crystal composition 1 | Liquid crystal composition 2 | Liquid crystal composition 3 | Liquid crystal composition 4 |
| VHR | 99.1 | 99.3 | 99.5 | 99.6 | 99.3 |
| ID | 77 | 51 | 25 | 36 | 42 |
| τ (ms) | 55.5 | 35 | 38 | 40 | 37 |
| Image persistence | Δ | ⊚ | ⊚ | ⊚ | ⊚ |

|  | Example 5 | Example 6 | Example 7 | Example 8 | Example 9 | Example 10 |
|---|---|---|---|---|---|---|
| Liquid crystal composition | Liquid crystal composition 5 | Liquid crystal composition 6 | Liquid crystal composition 7 | Liquid crystal composition 8 | Liquid crystal composition 9 | Liquid crystal composition 10 |
| VHR | 99.3 | 99.5 | 99.6 | 99.3 | 99.7 | 99.8 |
| ID | 51 | 25 | 36 | 42 | 40 | 39 |
| τ (ms) | 35 | 38 | 40 | 37 | 41 | 69 |
| Image persistence | ⊚ | ⊚ | ⊚ | ⊚ | ⊚ | ⊚ |

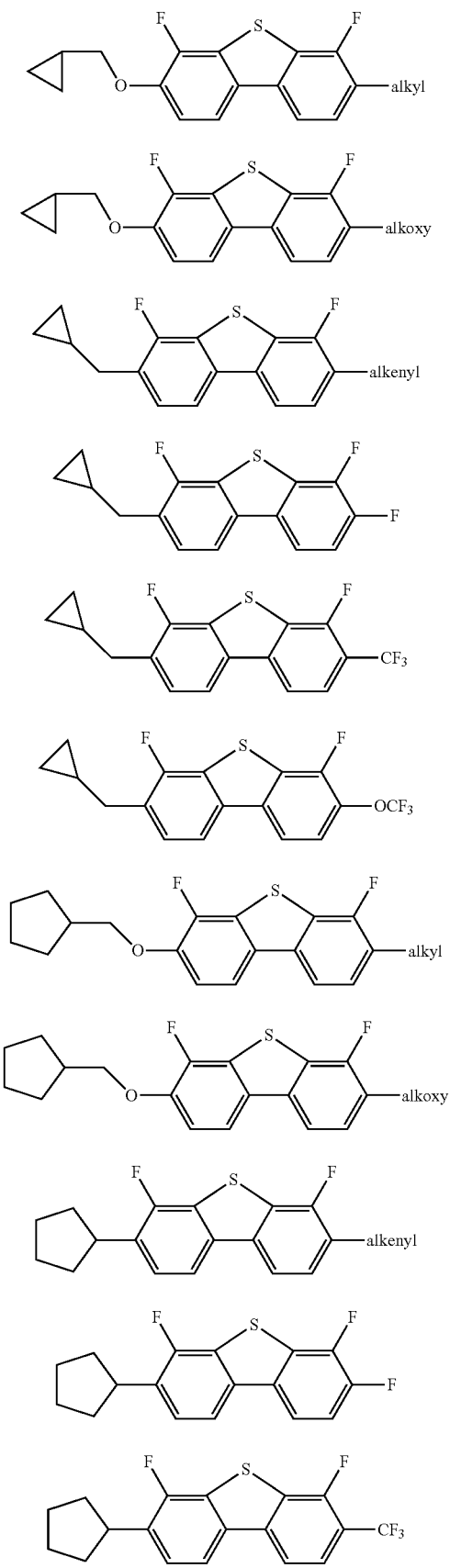

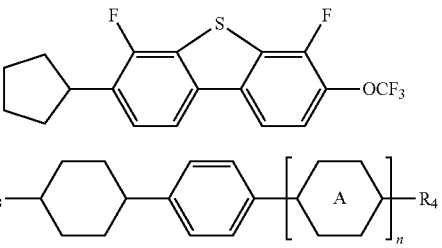

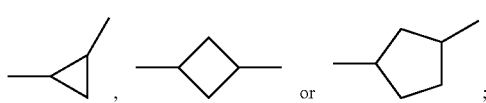

wherein alkyl represents a linear alkyl having a carbon atom number of 1-5;
alkoxy represents a linear alkoxy having a carbon atom number of 1-5;
alkenyl represents an alkenyl having a carbon atom number of 2-5;
$R_3$ and $R_4$ each independently represent a linear alkyl having a carbon atom number of 1-5, a linear alkoxy having a carbon atom number of 1-5, an alkenyl having a carbon atom number of 2-5, F, Cl, $CF_3$, $OCF_3$, or any methylene that may be replaced with

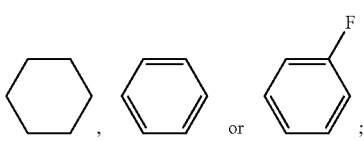

represents

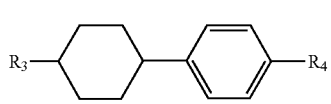

and
  n represents 0 or 1.

2. The liquid crystal composition according to claim 1, wherein the total content by mass of said one or more compounds represented by formulas I16-I27 is 1-20%, and the total content by mass of said one or more compounds represented by formula II is 1-35%.

3. The liquid crystal composition according to claim 1, wherein said one or more compounds represented by formula II are one or more of compounds represented by formulas II1-II4,

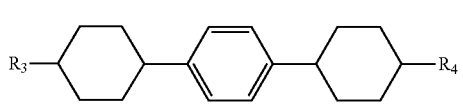

-continued

II3

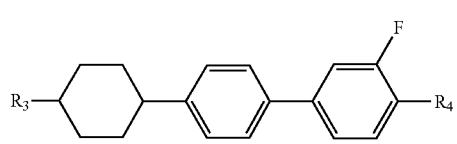
II4

$R_3$ and $R_4$ each independently represent a linear alkyl having a carbon atom number of 1-5, a linear alkoxy having a carbon atom number of 1-5 or an alkenyl having a carbon atom number of 2-5, or F, Cl, $CF_3$, $OCF_3$,

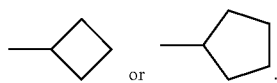

4. The liquid crystal composition according to claim 1, comprising one or more selected from compounds represented by formulas I16-I27 and two or more selected from compounds represented by formulas II1-II4, and said liquid crystal composition necessarily comprises two or more compounds represented by formulas II3.

5. The liquid crystal composition according to claim 1, further comprising one or more compounds represented by formula III

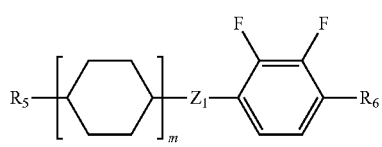
III wherein $R_5$ and $R_6$ each independently represent a linear alkyl having a carbon atom number of 1-5 or a linear alkoxy having a carbon atom number of 1-5;
$Z_1$ represents a single bond, —$CH_2O$— or —$OCH_2$—; and
m represents 1 or 2.

6. The liquid crystal composition according to claim 5, further comprising one or more compounds represented by general formula IV

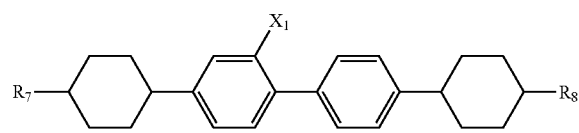
IV wherein $R_7$ and $R_8$ each independently represent a linear alkyl having a carbon atom number of 1-5 or a linear alkoxy having a carbon atom number of 1-5; and
$X_1$ represents H or F.

7. The liquid crystal composition according to claim 6, further comprising one or more compounds represented by formula V

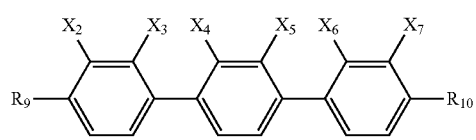
V wherein $R_9$ and $R_{10}$ each independently represent a linear alkyl having a carbon atom number of 1-5 or a linear alkoxy having a carbon atom number of 1-5;
and $X_2$, $X_3$, $X_4$, $X_5$, $X_6$ and $X_7$ each independently represent H or F, with at least two representing F.

8. The liquid crystal composition according to claim 7, wherein in said liquid crystal composition, the total content in percentage by mass of said one or more compounds represented by formulas I16-I27 is 1-10%, the total content in percentage by mass of said one or more compounds represented by formula III is 1-50%, the total content in percentage by mass of said one or more compounds represented by formula IV is 1-15%, and the total content in percentage by mass of said one or more compounds represented by formula V is 1-20%.

9. The liquid crystal composition according to claim 1, further comprising one or more polymerizable compounds.

10. The liquid crystal composition according to claim 9, wherein said polymerizable compound is a compound represented by general formula RM-1

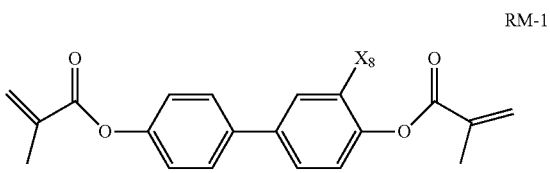
RM-1 wherein $X_8$ represents H or F.

11. A liquid crystal display element or liquid crystal display comprising the liquid crystal composition of claim 1, wherein said liquid crystal display element or liquid crystal display is an active matrix display element or display, or a passive matrix display element.

* * * * *